(12) United States Patent
Park et al.

(10) Patent No.: US 9,315,665 B2
(45) Date of Patent: Apr. 19, 2016

(54) METHOD FOR PREPARING RESIN COMPOSITION FOR EXPANDABLE POLYPROPYLENE CARBONATE AND EXPANDABLE POLYPROPYLENE CARBONATE PREPARED THEREFROM

(71) Applicants: SK INNOVATION CO., LTD., Seoul (KR); SK GLOBAL CHEMICAL CO., LTD., Seoul (KR)

(72) Inventors: Young Hyo Park, Daejeon (KR); Kwang Jin Chung, Daejeon (KR); Myung Ahn Ok, Daejeon (KR); Seung Gweon Hong, Daejeon (KR); Min Ho Jeon, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 369 days.

(21) Appl. No.: 13/728,701

(22) Filed: Dec. 27, 2012

(65) Prior Publication Data

US 2013/0172434 A1 Jul. 4, 2013

(30) Foreign Application Priority Data

Dec. 30, 2011 (KR) .................. 10-2011-0147165
Nov. 20, 2012 (KR) .................. 10-2012-0131569

(51) Int. Cl.
*C08L 69/00* (2006.01)
*C08J 9/00* (2006.01)
*C08J 9/12* (2006.01)
*C08J 9/18* (2006.01)
*C08J 9/232* (2006.01)

(52) U.S. Cl.
CPC .............. *C08L 69/00* (2013.01); *C08J 9/0061* (2013.01); *C08J 9/0066* (2013.01); *C08J 9/122* (2013.01); *C08J 9/18* (2013.01); *C08J 9/232* (2013.01); *C08J 2201/026* (2013.01); *C08J 2203/06* (2013.01); *C08J 2203/08* (2013.01); *C08J 2369/00* (2013.01); *C08J 2433/08* (2013.01); *C08J 2433/10* (2013.01); *C08J 2467/02* (2013.01); *C08J 2467/04* (2013.01); *C08J 2469/00* (2013.01)

(58) Field of Classification Search
None
See application file for complete search history.

(56) References Cited

U.S. PATENT DOCUMENTS

| 8,937,135 B2 * | 1/2015 | Steinke et al. ............. 525/410 |
| 2012/0041086 A1 * | 2/2012 | Sampath et al. ............. 521/59 |
| 2012/0190761 A1 * | 7/2012 | Jeon et al. ............. 521/88 |

FOREIGN PATENT DOCUMENTS

| KR | 10-2008-0087070 | 9/2008 |
| WO | WO 2010034689 A1 * | 4/2010 |

* cited by examiner

*Primary Examiner* — Kara Boyle
(74) *Attorney, Agent, or Firm* — The Webb Law Firm

(57) ABSTRACT

Provided herein are a method for preparing a resin composition for an expandable polypropylene carbonate and an expandable polypropylene carbonate prepared therefrom. More particularly, the present invention relates to a method for preparing a resin composition for an expandable polypropylene carbonate capable of using supercritical carbon dioxide as a foaming agent and preparing a foam having excellent moldability by an appropriate foaming method, and an expandable polypropylene carbonate prepared therefrom. The expandable polypropylene carbonate capable of having high magnification, excellent thermal stability, and dimensional stability may be prepared by using the resin composition according to the present invention.

14 Claims, No Drawings

METHOD FOR PREPARING RESIN COMPOSITION FOR EXPANDABLE POLYPROPYLENE CARBONATE AND EXPANDABLE POLYPROPYLENE CARBONATE PREPARED THEREFROM

CROSS-REFERENCE TO RELATED APPLICATIONS

This application claims priority under 35 U.S.C. §119 to Korean Patent Application No. 10-2011-0147165, filed on Dec. 30, 2011, and Korean Patent Application No. 10-2012-0131569, filed on Nov. 20, 2012, in the Korean Intellectual Property Office, the disclosure of which is incorporated herein by reference in its entirety.

TECHNICAL FIELD

The following disclosure relates to a method for preparing a resin composition for an expandable polypropylene carbonate and an expandable polypropylene carbonate prepared therefrom. More particularly, the following disclosure relates to a method for preparing a resin composition for an expandable polypropylene carbonate capable of using supercritical carbon dioxide as a foaming agent and preparing a foam having excellent moldability by an appropriate foaming method, and an expandable polypropylene carbonate prepared therefrom.

BACKGROUND

A synthetic resin foam is light and has excellent thermal insulating and buffering effects, such that the synthetic resin foam is variously used for an insulation material, a packaging material, a buffer, an interior material, or the like. Here, as an example of the used synthetic resin, there are various resins such as polystyrene, polyethylene, polypropylene, and the like. However, these resins should be changed into eco-friendly products for the future due to pollution problems occurring at the time of disposal of products.

Polycarbonate foam, which is synthetic resin foam, is disclosed in Korean Patent Laid-open Publication No. 2008-87070 (Patent Document 1).

Polypropylene carbonate, which is a product prepared using carbon dioxide as a raw material, is an eco-friendly product having an effect of reducing about 50% of the cost of petrochemical raw material, as compared with a product produced from the petrochemical raw material, and does not cause harmful gases generated from the existing synthetic resins even at the time of incineration. However, in the case in which this eco-friendly polypropylene carbonate is foamed alone, the polypropylene carbonate shrinks at room temperature after foaming, such that an initial shape thereof may not be maintained.

Therefore, an expandable polypropylene carbonate, which is eco-friendly, substituted for the existing synthetic resin foam, and has a shape retention performance and dimensional stability at usage temperature after foaming, has been demanded in view of economical and environmental aspects.

RELATED ART DOCUMENT

Patent Document (Patent Document 1) Korean Patent Laid-Open Publication No. 2008-87070

SUMMARY

An embodiment of the present invention is directed to providing a resin composition for an expandable polypropylene carbonate, which is eco-friendly, having excellent foaming performance and foam shape retention performance, and remarkably reducing harmful gases generated at the time of burning, and a method for the same.

Another embodiment of the present invention is directed to providing an expandable polypropylene carbonate prepared using the resin composition according to the present invention.

In one general aspect, there is provided a method for preparing a resin composition for an expandable polypropylene carbonate, the method including:

1) a cross-linking step of using a polypropylene carbonate resin (a1), a thermoplastic resin (a2), and a cross-linking agent, a chain extender, or a mixture thereof (C); and 2) a mixing step of mixing the obtained material in step 1), a polypropylene carbonate compatibilizer (B), an inorganic material (D), and a heat stabilizer (E) with one another.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

The present invention provides a method for preparing a resin composition for an expandable polypropylene carbonate, including:

1) a cross-linking step of using a polypropylene carbonate resin (a1), a thermoplastic resin (a2), and a cross-linking agent, a chain extender, or a mixture thereof (C); and 2) a mixing step of mixing the obtained material in step 1), a polypropylene carbonate compatibilizer (B), an inorganic material (D), and a heat stabilizer (E) with one another.

More specifically, the present invention provides three aspects of the method for preparing a resin composition for an expandable polypropylene carbonate.

In one aspect, the present invention provides a method for preparing a resin composition for an expandable polypropylene carbonate characterized in that the cross-linking step (step 1) includes kneading the polypropylene carbonate resin (a1) and the thermoplastic resin (a2) and then cross-linking the kneaded material using the cross-linking agent, the chain extender, or the mixture thereof (C).

In another aspect, the present invention provides a method for preparing a resin composition for an expandable polypropylene carbonate characterized in that the cross-linking step (step 1) includes cross-linking each of the polypropylene carbonate resin (a1) and the thermoplastic resin (a2) using the cross-linking agent, the chain extender, or the mixture thereof (C).

In another aspect, the present invention provides a method for preparing a resin composition for an expandable polypropylene carbonate characterized in that the cross-linking step (step 1) includes cross-linking the polypropylene carbonate resin (a1) alone and then secondarily cross-linking the cross-linked polypropylene carbonate resin with the thermoplastic resin (a2).

Here, the cross-linking step may include mixing the above-mentioned resin with the cross-linking agent, the chain extender, or the mixture thereof (C) and extruding the mixture using a twin screw extruder, thereby molding pellets.

In addition, the kneading and cross-linking step may include mixing the polypropylene carbonate resin (a1) and the thermoplastic resin (a2) and extruding the mixture using a twin screw extruder, thereby molding pellets.

With the method for preparing a resin composition for an expandable polypropylene carbonate according to the present invention, the expandable polypropylene carbonate capable of having high magnification, excellent thermal stability and dimensional stability may be prepared by inputting the cross-linking agent, a chain extender, or a mixture thereof (C) to increase melting strength at a processing temperature and inputting the polypropylene carbonate compatibilizer (B) to improve compatibility of the polypropylene carbonate resin (a1) and the thermoplastic resin (a2) constituting a base resin (A).

The base resin (A) may be made of 10 to 90 wt. % of the polypropylene carbonate resin (a1) and 10 to 90 wt % of the thermoplastic resin (a2), wherein the polypropylene carbonate resin (a1), which is high-molecular weight polypropylene carbonate or polypropylene carbonate copolymer, may have a weight average molecular weight of 10,000 to 1,000,000.

Further, dimensional stability and heat resistance of the expandable polypropylene carbonate may be improved by adding thermoplastic resin (a2). In the case in which a use content of the thermoplastic resin is less than 10 wt. %, it may be difficult to anticipate dimensional stability and heat resistance of foam molded products. As the thermoplastic resin (a2), specifically, one or a mixture of two or more selected from the group consisting of polyethylene terephthalate glycol (PETG), polylactic acid, polyvinylacetate, polycaprolactone, polymethylmethacrylate, polyethylene vinylacetate copolymer (EVA), polyethylene-methyl acrylate-glycidyl methacrylate copolymer, polyethylene, polypropylene, polybutylene, and copolyester having the following structure, may be used. According to the exemplary embodiment of the present invention, as the thermoplastic resin (a2), poly butylenes succinate (PBS, molecular weight: 170,000), polylactic acid (PLA, Natureworks, molecular weight: 90,000), or the like, may be used.

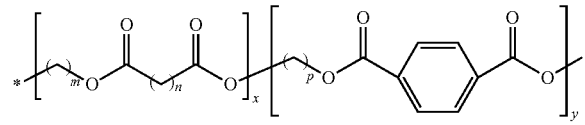

-continued

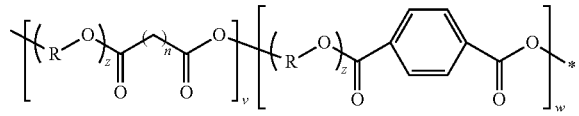

(In the above structure, —[R—O]$_z$— represents polyol selected from the group consisting of (a) polyester polyol triol having a molecular weight of 200 to 10,000, (b) polyether glycol having a molecular weight of 200 to 10,000, and (c) polyester polyol diol having a molecular weight of 10,000 or less; m represents an integer of 2 to 10, n represents an integer of 0 to 18; p represents an integer of 2 to 10, and v, w, x, and y each represent an integer of 0 to 100.)

In order to increase the compatibility between the polypropylene carbonate resin (a1) and the thermoplastic resin (a2) in the base resin (A), the polypropylene carbonate compatibilizer (B) is used in 0.1 to 20 parts by weight based on 100 parts by weigh of the base resin (A). Here, the compatibilizer may be an acryl-based copolymer having a weight average molecular weight of 5,000 to 10,000,000 g/mol, or low-molecular weight polypropylene carbonate or polypropylene carbonate copolymer, which has a weight average molecular weight of 500 to 1,000,000 g/mol. The acryl-based copolymer may be a polymer formed by copolymerization of at least two monomers selected from a group consisting of a linear alkyl (meth)acrylate monomer, a branched alkyl (meth)acrylate monomer, a cyclic alkyl (meth)acrylate monomer, and combinations thereof.

The cross-linking agent, the chain extender, or the mixture thereof (C) are inputted, such that the melt viscosity of polypropylene carbonate (PPC) and the thermoplastic polymer may be increased, and a stable shape may be obtained at the time of foaming. Here, when the use content of the cross-linking agent, the chain extender, or the mixture thereof is less than 0.01 parts by weight, the usage thereof is meaningless, and when the use content is more than 10 parts by weight, the melt viscosity of the mixture are excessively high, such that the mixture may not be appropriate to process. At least one polyisocyanate selected from a group consisting of 2,4-tolylene diisocyanate, 2,6-tolylene diisocyanate, 4,4'-diphenylmethane diisocyanate (MDI), m-phenylene diisocyanate, xylylene diisocyanate, tetramethylene diisocyanate, hexamethylene diisocyanate, lysine diisocyanate ester, 1,4-cyclohexylene diisocyanate, 4,4'-dicyclohexylmethane diisocyanate, 3,3'-dimethyl-4,4'-biphenylene diisocyanate, N-p-maleimidophenyl isocyanate, 1,6-hexamethylene diisocyanate, and isophorone diisocyanate, may be used as the cross-linking agent, and one or a mixture of two or more diols or a polyol mixture selected from a group consisting of ethylene glycol, 1,4-buthane diol, 1,5-pentane diol, 1,6-hexane diol, 1,10-decane diol, 2,2-dimethyl-1,3-propane diol, 1,3-propane diol, trimethyl propanol, bisphenol, polyester diol, polyether diol, polycaprolactone diol, and polycarbonate diol, may be used as the chain extender. Also, the cross-linking agent and the chain extender may be used in combination.

The inorganic material (D) may be used in order to improve the shape stability and the heat resistance of the foam after foaming, wherein when the content thereof is less than 0.1 parts by weight, the adding thereof is meaningless, and when the content is 10 parts by weight or more, the foaming performance is decreased. Specifically, one or a mixture of two or more selected from a group consisting of titanium dioxide, talc, kaolin, wollastonite, mica, and ceramic particles including one or more metals selected from, the group consisting of titanium (Ti), lead (Pb), barium (Ba), silicon (Si), tin (Sn), calcium (Ca), magnesium (Mg), aluminum (Al), niobium (Nb), zirconium (Zr), iron (Fe), tungsten (W), vanadium (V), manganese (Mn), cobalt (Co), nickel (Ni), zinc (Zn), and rare metal elements may be used as the inorganic material.

The heat stabilizer (E) is used in order to protect the composition from a heat decomposition phenomenon that may occur at the time of material processing, wherein when the content thereof is less than 0.01 parts by weight, the adding thereof is meaningless, and when the content is 1 part by weight or more, it may be difficult to expect further thermal stability. As the heat stabilizer, one or a mixture of two or more selected from a group consisting of phenol-based, hydroquinone-based, benzyl alcohol-based, quinone-based, and amine-based compounds may be used. Specifically, one or a mixture of two or more selected from a group consisting of phenothiazine, p-methoxyphenol, cresol, benzhydrol, 2-methoxy-p-hydroquinone, 2,5-di-tert-butylquinone, and diisopropylamine may be preferably used.

In addition, the resin composition for an expandable polypropylene carbonate may further include, besides the above constituent elements (A) to (E), a flame retardant agent (F), an impact reinforcement agent (G), or a mixture thereof.

The flame retardant agent is used to impart a flame retardant property or improve heat resistance, and examples thereof are particularly not limited. Specifically, one or a mixture of two or more selected from a group consisting of phosphor-based flame retardant agents, nitrogen compound-based flame retardant agents, silicon-based flame retardant agents, inorganic-based flame retardant agents, melamine-based flame retardant agents, and halogen-based flame retardant agents may be used.

The phosphor-based flame retardant agent means a common flame retardant agent containing phosphor. Specific examples thereof may include, red phosphite, phosphate, phosphorate, phosphinate, phosphine oxide, phosphazene, metal salts thereof, or the like, but is necessarily not limited thereto. Examples of the nitrogen compound-based flame retardant agent may include aliphatic amine compounds, aromatic amine compounds, nitrogen-containing heterocyclic compounds, cyan compounds, aliphatic amides, aromatic amides, urea, and thiourea, or the like. Examples of the silicon-based flame retardant agent may include silicon resin and silicon oil. Examples of the silicon resin include resins having a three-dimensional net structure where $RSiO_{3/2}$, RSiO, or $RSiO_{1/2}$ units may be combined, or the like. Here, R represents an alkyl group having 1 to 10 carbon atoms such as methyl, ethyl, propyl, or the like, an aromatic group, or a substituted group in which a vinyl group is contained in each of the above groups. Examples of the silicon oil may include polydimethyl siloxane, modified polysiloxane and a mixture thereof, in which at least one methyl group at a side chain or a terminal of polydimethyl siloxane is modified by at least one selected from a group consisting of hydrogen, alkyl, cyclohexyl, phenyl, benzyl, epoxy, polyether, carboxyl, mercapto, chloroalkyl, alkyl alcohol ester, alcohol, allyl, vinyl, trifluoromethyl, and a combination thereof. Examples of the inorganic based flame retardant agent may include silicon dioxide ($SiO_2$), magnesium hydroxide, aluminum hydroxide, antimony trioxide, antimony pentoxide, antimony, sodium carbonate, zinc hydroxy stannate, zinc stannate, metastannic acid tin oxide, tin oxide salts, zinc sulfate, zinc oxide, ferrous oxide, ferric oxide, stannous oxide, stannic oxide, zinc borate, calcium borate, ammonium borate, ammonium octamolybdate, metal salts of tungstic acid, composite oxides of tungsten and metalloid, zirconium based compounds, guanidine based compounds, graphite, talc, expandable graphite, and the like. Examples of the melamine-based flame retardant agent may include melamine phosphate, dimelamine phosphate, melamine pyrophosphate, melamine cyanurate and the like. As long as the halogen-based compound may function as a flame retardant agent, any halogen-based compound may be used without limitation.

For example, a commercialized halogen-based flame retardant agent, such as, decabromo diphenyl ether, decabromo diphenyl ethane, tetrabromo bisphenol-A, tetrabromo bisphenol-A epoxy oligomer, octabromo trimethylphenyl indane, ethylene-bis-tetrabromophthalimide, tris(tribromophenyl)triazine, polystyrene bromide, or the like, may be used.

The flame retardant agent may be further included in the composition in 0.01 to 50 parts by weight based on 100 parts by weight of the base resin, wherein when the content thereof is less than 0.01 parts by weight, it may be difficult to obtain a flame retardant effect, and when the content is more than 50 parts by weight, physical properties, such as, impact strength, and the like, may be remarkably deteriorated.

The impact reinforcement agent, which is used to improve impact resistant property, may be further included in 1 to 20 parts by weight based on 100 parts by weight of the base resin, wherein when the content thereof is less than 1 part by weight, an impact reinforcement effect is decreased, and when the content is more than 20 parts by weight, scratch resistant property and flame retardant property may be deteriorated. At least one selected from a group consisting of a core-shell structured copolymer and a chain structure reinforcement agent may be used as the impact reinforcement agent. The core-shell structure copolymer preferably has a structure where an unsaturated monomer selected from a group consisting of alkyl(meth)acrylate, (meth)acrylate, acid anhydride, alkyl or phenyl nucleus-substituted maleimide, and combinations thereof is grafted onto a core made of rubber selected from a group consisting of diene-based rubber, acryl-based rubber, silicon-based rubber, and combinations thereof to thereby form a shell.

In addition, the expandable polypropylene carbonate is prepared by foaming the resin composition for preparing an expandable polypropylene carbonate, which includes the base resin (A) consisting of polypropylene carbonate resin without generation of harmful gases at the time of burning, and the thermoplastic resin; the polypropylene carbonate compatibilizer (B); the cross-linking agent, the chain extender, or the mixture thereof (C); the inorganic material (D); and the heat stabilizer (E), after a supercritical state fluid is maintained at an appropriate temperature and an appropriate pressure.

When an expandable polypropylene carbonate is prepared by using the composition for preparing an expandable polypropylene carbonate according to the present invention, the composition and a supercritical fluid as a foaming agent are fed into a main reactor, and then heated to a temperature close to a melt point of the thermoplastic resin included in the composition, preferably. In other words, since the foaming agent is difficult to uniformly permeate into the composition when the thermoplastic resin is melting, the composition is favorably heated right before the composition is completely melted while having flowability. This heating temperature may be selected according to a kind of thermoplastic resin. For example, in a case where polybutylene succinate (PBS) is mixed with polypropylene carbonate as the thermoplastic resin to prepare a composition, at the time of preparing the foam, it may be preferable to perform heating from room temperature (25° C.) to a set temperature of 80 to 100° C., and maintain the heated material at the set temperature for 5 to 30 minutes. Then, it is preferable to remove the supercritical fluid at the temperature of 80 to 100° C. to perform the foaming.

When an expandable polypropylene carbonate is prepared by using the composition for preparing an expandable polypropylene carbonate according to the present invention, two kinds of foaming agents, that is, a first foaming agent and a second foaming agent may be simultaneously used, or only one kind of foaming agent, that is, only the second foaming agent may be used.

Any one foaming agent that can be commonly employed in preparing the existing expandable polyolefin may be used as the first foaming agent. In the present invention, examples of the first foaming agent used in preparing the existing expandable polyolefin may include one or a mixture of two or more selected from isobutane, butane, propane, and pentane.

In the present invention, a supercritical fluid may be used as the second foaming agent. Here, any supercritical fluid that may be used as the foaming agent may be used as the second foaming agent. In the present invention, examples of the supercritical fluid may be used to prepare the expandable polyolefin as the second foaming agent may include one or a mixture of two or more selected from supercritical carbon dioxide, supercritical isobutane, supercritical butane, supercritical propane, and supercritical pentane. In the present invention, as the foaming agent, a content of the second foaming agent may be 1 to 20 times higher than a content of the first foaming agent.

As set forth above, the expandable polypropylene carbonate prepared by the method for preparing a resin composition for an expandable polypropylene carbonate is within the scope of the present invention.

Hereinafter, the present invention will be specifically described through Examples. However, Examples of the present invention have been disclosed for illustrative purposes, but the scopes of the present invention are not limited thereto.

Hereinafter, physical properties were measured by the following methods.

<Evaluation on Heat-Resistant Temperatures>

The upper limit temperature, at which deformation of a foam does not occur and an initial shape and dimensional stability of the expandable foam are maintained for a predetermined time period, was measured.

<Evaluation on Flammability>

Flammability of a foam was measured according to the flammability evaluation method of KSM 3808, by testing whether the ignited fire was extinguished within 3 seconds.

Example 1

100 parts by weight of a base resin consisting of 70 wt. % of polypropylene carbonate (molecular weight: 150,000) and 30 wt. % of polybutylene succinate (PBS, molecular weight: 170,000), 1 part by weight of a polypropylene carbonate compatibilizer (a polypropylene carbonate copolymer, molecular weight: 150,000, SK Energy Company), 0.5 parts by weight of polymeric-4,4'-diphenylmethane diisocyanate (MDI), 5 parts by weight of $CaCO_3$, and 0.02 parts by weight of a heat stabilizer (Songnox 1076, SongWon Company) were mixed and extruded by a twin screw extruder, thereby molding pellets. Then, the prepared pellets were inputted into a main reactor and carbon dioxide was injected thereinto, followed by maintaining a state of supercritical carbon dioxide for 1 hour so that the supercritical carbon dioxide was permeated into the pellets while increasing the temperature from the room temperature to 105° C., and then the carbon dioxide gas exhausted through an exhaust port, thereby forming a foam. The foaming results were tabulated in table 1.

Example 2

100 parts by weight of polypropylene carbonate (molecular weight: 150,000) was mixed with 0.5 parts by weight of polymeric-4,4'-diphenylmethane diisocyanate (MDI) and extruded by a twin screw extruder, thereby molding pellets. Then, 100 parts by weight of a base resin consisting of 70 wt. % of the prepared pellets and 30 wt. % of polybutylene succinate, 1 part by weight of a propropylene carbonate compatibilizer (a polypropylene carbonate copolymer, molecular weight: 150,000, SK Energy Company), 5 parts by weight of $CaCO_3$, and 0.02 parts by weight of a heat stabilizer (Songnox 1076, SongWon Company), 0.5 parts by weight of polymeric-4,4'-diphenylmethane diisocyanate (MDI) were mixed and extruded by the twin screw extruder, thereby molding pellets again. Then, the finally prepared pellets were inputted into a main reactor and carbon dioxide was injected thereinto, followed by maintaining a state of supercritical carbon dioxide for 1 hour so that the supercritical carbon dioxide was permeated into the pellets while increasing the temperature from the room temperature to 105° C., and then the carbon dioxide gas exhausted through an exhaust port, thereby forming a foam. The foaming results were tabulated in table 1.

Example 3

100 parts by weight of a base resin consisting of 70 wt. % of polypropylene carbonate (molecular weight: 150,000) and 30 wt. % of polybutylene succinate (PBS, molecular weight: 170,000), 1 part by weight of a polypropylene carbonate compatibilizer (a polypropylene carbonate copolymer, molecular weight: 150,000, SK Energy Company), 5 parts by weight of $CaCO_3$, and 0.02 parts by weight of a heat stabilizer (Songnox 1076, SongWon Company) were mixed and extruded by a twin screw extruder, thereby molding pellets. Then, the prepared pellets and 0.5 parts by weight of polymeric-4,4'-diphenylmethane diisocyanate (MDI) were mixed and extruded by the twin screw extruder, thereby molding pellets again. Then, the finally prepared pellets were inputted into a main reactor and carbon dioxide was injected thereinto, followed by maintaining a state of supercritical carbon dioxide for 1 hour so that the supercritical carbon dioxide was permeated into the pellets while increasing the temperature from the room temperature to 105° C., and then the carbon dioxide gas exhausted through an exhaust port, thereby forming a foam. The foaming results were tabulated in table 1.

Example 4

100 parts by weight of polypropylene carbonate (molecular weight: 150,000) was mixed with 0.5 parts by weight of polymeric-4,4'-diphenylmethane diisocyanate (MDI) and extruded by a twin screw extruder, thereby molding pellets (hereinafter, referred to as M-PPC), and 100 parts by weight of polybutylene succinate (molecular weight: 170,000) was mixed with 0.5 parts by weight of 4,4'-diphenylmethane diisocyanate (MDI) and extruded by the twin screw extruder, thereby molding pellets (hereinafter, referred to as M-PBS). Then, 100 parts by weight of a base resin consisting of 70 wt. % of M-PPC and 30 wt. % of M-PBS, 1 part by weight of a polypropylene carbonate compatibilizer (a polypropylene carbonate copolymer, molecular weight: 150,000, SK Energy Company), 5 parts by weight of $CaCO_3$, and 0.02 parts by weight of a heat stabilizer (Songnox 1076, SongWon Company) were mixed and extruded by the twin screw extruder, thereby molding pellets again. Then, the finally prepared pellets were inputted into a main reactor and carbon dioxide was injected thereinto, followed by maintaining a state of supercritical carbon dioxide for 1 hour so that the supercritical carbon dioxide was permeated into the pellets while increasing the temperature from the room temperature to 110° C., and then the carbon dioxide gas exhausted through an exhaust port, thereby forming a foam. The foaming results were tabulated in table 1.

Example 5

100 parts by weight of a base resin consisting of 50 wt. % of polypropylene carbonate (molecular weight: 150,000) and 50 wt. % of polybutylene succinate, 1 part by weight of a polypropylene carbonate compatibilizer (a polypropylene carbonate copolymer, molecular weight: 150,000, SK Energy Company), 0.5 parts by weight of polymeric-4,4'-diphenylmethane diisocyanate (MDI), 5 parts by weight of $CaCO_3$, and 0.02 parts by weight of a heat stabilizer (Songnox 1076, SongWon Company) were mixed and extruded by a twin screw extruder, thereby molding pellets. Then, the prepared pellets were inputted into a main reactor and carbon dioxide was injected thereinto, followed by maintaining a state of supercritical carbon dioxide for 1 hour so that the supercritical carbon dioxide was permeated into the pellets while increasing the temperature from the room temperature to 110° C., and then the carbon dioxide gas exhausted through an exhaust port, thereby forming a foam. The foaming results were tabulated in table 1.

Example 6

100 parts by weight of polypropylene carbonate (molecular weight: 150,000) was mixed with 0.5 parts by weight of polymeric-4,4'-diphenylmethane diisocyanate (MDI) and extruded by a twin screw extruder, thereby molding pellets. Then, 100 parts by weight of a base resin consisting of 50 wt. % of the prepared pellets and 50 wt. % of polybutylene succinate, 1 part by weight of a polypropylene carbonate compatibilizer (a polypropylene carbonate copolymer, molecular weight: 150,000, SK Energy Company), 5 parts by weight of $CaCO_3$, 0.02 parts by weight of a heat stabilizer (Songnox 1076, SongWon Company), and 0.5 parts by weight of polymeric-4,4'-diphenylmethane diisocyanate (MDI) were mixed and extruded by the twin screw extruder, thereby molding pellets again. Then, the finally prepared pellets were inputted into a main reactor and carbon dioxide was injected thereinto, followed by maintaining a state of supercritical carbon dioxide for 1 hour so that the supercritical carbon dioxide was permeated, into the pellets while increasing the temperature from the room temperature to 110° C., and then the carbon dioxide gas exhausted through an exhaust port, thereby forming a foam. The foaming results were tabulated in table 1.

Example 7

100 parts by weight of a base resin consisting of 50 wt. % of polypropylene carbonate (molecular weight: 150,000) and 50 wt. % of polybutylene succinate (PBS, molecular weight: 170,000), 1 part by weight of a polypropylene carbonate compatibilizer (a polypropylene carbonate copolymer, molecular weight: 150,000, SK Energy Company), 5 parts by weight of $CaCO_3$, and 0.02 parts by weight of a heat stabilizer (Songnox 1076, SongWon Company) were mixed and extruded by a twin screw extruder, thereby molding pellets. Then, the prepared pellets and 0.5 parts by weight of polymeric-4,4'-diphenylmethane diisocyanate (MDI) were mixed and extruded by the twin screw extruder, thereby molding pellets again. Then, the finally prepared pellets were inputted into a main reactor and carbon dioxide was injected thereinto, followed, by maintaining a state of supercritical carbon dioxide for 1 hour so that the supercritical carbon dioxide was permeated into the pellets while increasing the temperature from the room temperature to 110° C., and then the carbon dioxide gas exhausted through an exhaust port, thereby forming a foam. The foaming results were tabulated in table 1.

Example 8

100 parts by weight of polypropylene carbonate (molecular weight: 150,000) was mixed with 0.5 parts by weight of polymeric-4,4'-diphenylmethane diisocyanate (MDI) and extruded by a twin screw extruder, thereby molding pellets (hereinafter, referred to as M-PPC), and 100 parts by weight of polybutylene succinate (molecular weight: 170,000) was mixed with 0.5 parts by weight of polymeric-4,4'-diphenylmethane diisocyanate (MDI) and extruded by the twin screw extruder, thereby molding pellets (hereinafter, referred to as M-PBS). Then, 100 parts by weight of a base resin consisting of 50 wt. % of M-PPC and 50 wt. % of M-PBS, 1 part by weight of a polypropylene carbonate compatibilizer (a polypropylene carbonate copolymer, molecular weight: 150,000, SK Energy Company), 5 parts by weight of $CaCO_3$, and 0.02 parts by weight of a heat stabilizer (Songnox 1076, SongWon Company) were mixed and extruded by the twin screw extruder, thereby molding pellets again. Then, the finally prepared pellets were inputted into a main reactor and carbon dioxide was injected thereinto, followed by maintaining a state of supercritical carbon dioxide for 1 hour so that the supercritical carbon dioxide was permeated into the pellets while increasing tins temperature from the room temperature to 110° C., and then the carbon dioxide gas exhausted through an exhaust port, thereby forming a foam. The foaming results were tabulated in table 1.

Example 9

100 parts by weight of a base resin consisting of 70 wt. % of polypropylene carbonate (molecular weight: 150,000) and 30 wt. % of polylactic acid (PLA, Natureworks, molecular weight: 90,000), 1 part by weight of a polypropylene carbonate compatibilizer (a polypropylene carbonate copolymer, molecular weight: 150,000, SK Energy Company), 0.5 parts by weight of polymeric-4,4'-diphenylmethane diisocyanate (MDI), 5 parts by weight of $CaCO_3$, and 0.02 parts by weight of a heat stabilizer (Songnox 1076, SongWon Company) were mixed and extruded by a twin screw extruder, thereby molding pellets. Then, the prepared pellets were inputted into a main reactor and carbon dioxide was injected thereinto, followed by maintaining a state of supercritical carbon dioxide for 1 hour so that the supercritical carbon dioxide was permeated into the pellets while increasing the temperature from the room temperature to 130° C., and then the carbon dioxide gas exhausted through an exhaust port, thereby forming a foam. The foaming results were tabulated in table 1.

Example 10

100 parts by weight of polypropylene carbonate (molecular weight: 150,000) was mixed with 0.5 parts by weight of polymeric-4,4'-diphenylmethane diisocyanate (MDI) and extruded by a twin screw extruder, thereby molding pellets. Then, 100 parts by weight of a base resin consisting of 70 wt. % of the prepared pellets and 30 wt. % of polylactic acid (PLA, Natureworks, molecular weight: 90,000), 1 part by weight of a polypropylene carbonate compatibilizer (a polypropylene carbonate copolymer, molecular weight: 150,000, SK Energy Company), 5 parts by weight of $CaCO_3$, 0.02 parts by weight of a heat stabilizer (Songnox 1076, SongWon Company), and 0.5 parts by weight of polymeric-4,4'-diphenylmethane diisocyanate (MDI) were mixed and extruded by the twin screw extruder, thereby molding pellets again. Then, the finally prepared pellets were inputted into a main reactor and carbon dioxide was injected thereinto, followed by maintaining a state of supercritical carbon dioxide for 1 hour so that the supercritical carbon dioxide was permeated into the pellets while increasing the temperature from the room temperature to 130° C., and then the carbon dioxide gas exhausted through an exhaust port, thereby forming a foam. The foaming results were tabulated in table 1.

Example 11

100 parts by weight of a base resin consisting of 70 wt. % of polypropylene carbonate (molecular weight: 150,000) and 30 wt. % of polylactic acid (PLA, Natureworks, molecular weight: 90,000), 1 part by weight of a polypropylene carbonate compatibilizer (a polypropylene carbonate copolymer, molecular weight: 150,000, SK Energy Company), 5 parts by weight of $CaCO_3$, and 0.02 parts by weight of a heat stabilizer (Songnox 1076, SongWon Company) were mixed and extruded by a twin screw extruder, thereby molding pellets. Then, the prepared pellets and 0.5 parts by weight of polymeric-4,4'-diphenylmethane diisocyanate (MDI) were mixed and extruded by the twin screw extruder, thereby molding pellets again. Then, the finally prepared pellets were inputted into a main reactor and carbon dioxide was injected thereinto, followed by maintaining a state of supercritical carbon dioxide for 1 hour so that the supercritical carbon dioxide was permeated into the pellets while increasing the temperature from the room temperature to 130° C., and then the carbon dioxide gas exhausted through an exhaust port, thereby forming a foam. The foaming results were tabulated in table 1.

Comparative Example 1

Polypropylene carbonate (molecular weight: 150,000) pellets were inputted into a main reactor and carbon dioxide was injected into the main reactor, followed by maintaining a state of supercritical carbon dioxide for 1 hour so that the supercritical carbon dioxide was permeated into the pellets while increasing the temperature from the room temperature to 40° C., and then the carbon dioxide gas exhausted through an exhaust port, thereby forming a foam. The foaming results were tabulated in table 1.

TABLE 1

| | unit | Comparative Example 1 | Example 1 | Example 2 | Example 3 | Example 4 | Example 5 |
|---|---|---|---|---|---|---|---|
| Base resins (A) PPC content | wt. % | 100 | 70 | 70 | 70 | 70 | 50 |
| PBS content | wt. % | 0 | 30 | 30 | 30 | 30 | 50 |
| PLA content | wt. % | 0 | 0 | 0 | 0 | 0 | 0 |
| PPC compatibilizer (B) | Parts by weight | 0 | 1 | 1 | 1 | 1 | 1 |
| Cross-linking agent/chain extender (C) | Parts by weight | 0 | 0.5 | 0.85 | 0.5 | 0.5 | 0.5 |
| Inorganic material (D) | Parts by weight | 0 | 5 | 5 | 5 | 5 | 5 |
| Heat stabilizer (E) | Parts by weight | 0 | 0.02 | 0.02 | 0.02 | 0.02 | 0.02 |
| Flame retardent agent (F) | Parts by weight | 0 | 0 | 0 | 0 | 0 | 0 |
| Impact reinforcement agent (G) | Parts by weight | 0 | 0 | 0 | 0 | 0 | 0 |
| Foaming temperature | ° C. | 40 | 105 | 105 | 105 | 105 | 110 |
| $CO_2$ pressure | bar | 140 | 140 | 140 | 140 | 140 | 140 |
| Foaming ratio | Multiples | 40 | 10 | 20 | 25 | 26 | 15 |
| Heat resistant temperature | ° C. | 25 | 70 | 80 | 80 | 80 | 80 |
| Heat resistant temperature retention time | Hours | 0.5 | 24 | 24 | 24 | 24 | 24 |

TABLE 1-continued

| | unit | Example 6 | Example 7 | Example 8 | Example 9 | Example 10 | Example 11 |
|---|---|---|---|---|---|---|---|
| KSM 3808 Flameproofing property | Within seconds | 3 | 3 | 3 | 3 | 3 | 3 |

| | | unit | Example 6 | Example 7 | Example 8 | Example 9 | Example 10 | Example 11 |
|---|---|---|---|---|---|---|---|---|
| Base resins (A) | PPC content | wt. % | 50 | 50 | 50 | 70 | 70 | 70 |
| | PBS content | wt. % | 50 | 50 | 50 | 0 | 0 | 0 |
| | PLA content | wt. % | 0 | 0 | 0 | 30 | 30 | 30 |
| PPC compatibilizer (B) | | Parts by weight | 1 | 1 | 1 | 1 | 1 | 1 |
| Cross-linking agent/chain extender (C) | | Parts by weight | 0.75 | 0.5 | 0.5 | 0.5 | 0.85 | 0.5 |
| Inorganic material (D) | | Parts by weight | 5 | 5 | 5 | 5 | 5 | 5 |
| Heat stabilizer (E) | | Parts by weight | 0.02 | 0.02 | 0.02 | 0.02 | 0.02 | 0.02 |
| Flame retardent agent (F) | | Parts by weight | 0 | 0 | 0 | 0 | 0 | 0 |
| Impact reinforcement agent (G) | | Parts by weight | 0 | 0 | 0 | 0 | 0 | 0 |
| Foaming temperature | | °C. | 110 | 110 | 110 | 130 | 130 | 130 |
| $CO_2$ pressure | | bar | 140 | 140 | 140 | 140 | 140 | 140 |
| Foaming ratio | | Multiples | 25 | 30 | 25 | 15 | 25 | 30 |
| Heat resistant temperature | | °C. | 90 | 90 | 90 | 90 | 90 | 90 |
| Heat resistant temperature retention time | | Hours | 24 | 24 | 24 | 24 | 24 | 24 |
| KSM 3808 Flameproofing property | | Within seconds | 3 | 3 | 3 | 3 | 3 | 3 |

As shown in Table 1, the foam formed in Comparative example 1 had a foaming ratio of 40 times, and the formed foam shrunk at room temperature within 0.5 hours, and as a result, shape retention was impossible. The foam formed in each of Examples 1 to 11 had a foaming ratio of 10 to 30 times, and the formed foam showed excellent shape stability and dimensional stability even though it was left in an oven at 70 to 90° C. for 24 hours.

As set forth above, the expandable polypropylene carbonate capable of having high magnification, remarkably reducing harmful gases generated at the time of burning, and having excellent thermal stability and dimensional stability may be prepared by using the resin composition for an expandable polypropylene carbonate and the method for preparing the same according to the present invention.

What is claimed is:

1. A method for preparing a resin composition for an expandable polypropylene carbonate, the method comprising:
   1) providing components consisting of polypropylene carbonate resin (a1), a thermoplastic resin (a2), a compatibilizer (B), a cross-linking agent, a chain extender, or a mixture thereof (C), an inorganic material (D), and a heat stabilizer (E);
   2) cross-linking the polypropylene carbonate resin (a1), the thermoplastic resin (a2), and the cross-linking agent, the chain extender, or the mixture thereof (C) provided in step 1); and
   3) mixing the obtained material in step 1), step 2) and the compatibilizer (B), the inorganic material (D), and the heat stabilizer (E) provided in step 1) with one another,
   wherein the compatibilizer (B) compatibilizes between the polypropylene carbonate resin (a1) and the thermoplastic resin (a2).

2. The method of claim 1, wherein the cross-linking step (step 2) is a step of kneading the polypropylene carbonate resin (a1) and the thermoplastic resin (a2) to cross-link them or a step of cross-linking each of the polypropylene carbonate resin (a1) and the thermoplastic resin (a2) to mix them.

3. The method of claim 1, wherein the cross-linking step (step 2) includes cross-linking the polypropylene carbonate resin (a1) alone and then secondarily cross-linking the cross-linked polypropylene carbonate resin with the thermoplastic resin (a2).

4. The method of claim 1, further comprising:
cross-linking 100 parts by weight of a base resin (A) consisting of 10 to 90 wt. % of the polypropylene carbonate resin (a1) and 10 to 90 wt. % of the thermoplastic resin (a2), 0.1 to 20 parts by weight of the compatibilizer (B), and 0.01 to 10 parts by weight of the cross-linking agent, the chain extender, or the mixture thereof (C) in step 2); and
mixing 0.1 to 10 parts by weight of the inorganic material (D), and 0.01 to 1 part by weight of the heat stabilizer (E) with the material obtained in step 2.

5. The method of claim 4, wherein the polypropylene carbonate resin (a1) has a weight average molecular weight of 10,000 to 1,000,000.

6. The method of claim 4, wherein the thermoplastic resin (a2) is one or a mixture of two or more selected from the group consisting of polyethylene terephthalate glycol (PETG), polylactic acid, polyvinylacetate, polycaprolactone, polymethylmethacrylate, polyethylene-vinylacetate copolymer (EVA), polyethylenemethacrylate glycidylmethacrylate copolymer, polyethylene, polypropylene, polybutylene and copolyester having the following structure:

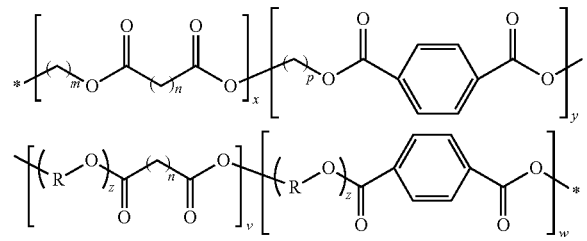

(Where, —[R—O]$_z$— represents polyol selected from the group consisting of (a) polyester polyol triol having a molecular weight of 200 to 10,000, (b) polyether glycol having a molecular weight of 200 to 10,000, and (c) polyester polyol diol having a molecular weight of 10,000 or less; m represents an integer of 2 to 10, n represents an integer of 0 to 18; p represents an integer of 2 to 10, and v, w, x and y each represent an integer of 0 to 100.).

7. The method of claim 4, wherein the compatibilizer (B) is an acryl-based copolymer having a weight average molecular weight of 5,000 to 10,000,000 g/mol.

8. The method of claim 7, wherein the acryl-based copolymer is a polymer formed by copolymerization of at least two monomers selected from the group consisting of a linear alkyl (meth)acrylate monomer, a branched alkyl (meth)acrylate monomer, a cyclic alkyl (meth)acrylate monomer, and combinations thereof.

9. The method of claim 4, wherein the compatibilizer (B) is low-molecular weight polypropylene carbonate or polypropylene carbonate copolymer, which has a weight average molecular weight of 500 to 1,000,000 g/mol.

10. The method of claim 4, wherein the cross-linking agent is one or a mixture of two or more selected from 2,4-tolylene diisocyanate, 2,6-tolylene diisocyanate, 4,4'-diphenylmethane diisocyanate, m-phenylene diisocyanate, xylylene diisocyanate, tetramethylene diisocyanate, hexamethylene diisocyanate, lysine diisocyanateester, 1,4-cyclohexylene diisocyanate, 4,4'-dicyclohexylmethane diisocyanate, 3,3'-dimethyl-4,4'-biphenylene diisocyanate, N-p-maleimidophenyl isocyanate, 1,6-hexamethylene diisocyanate, and isophorone diisocyanate.

11. The method of claim 4, wherein the chain extender is one or a mixture of two or more selected from the group consisting of ethylene glycol, 1,4-butanediol, 1,5-pentanediol, 1,6-hexanediol, 1,10-decanediol, 2,2-dimethyl-1,3-propanediol, 1,3-propanediol, trimethylpropanol, bisphenol, polyester diol, polyether diol, polycaprolactonediol, and polycarbonatediol.

12. The method of claim 4, wherein the inorganic material (D) is one or a mixture of two or mere selected from the group consisting of titanium dioxide, talc, kaolin, wollastonite, mica, and ceramic particles including one or more metals selected from the groups consisting of titanium (Ti), lead (Pb), barium (Ba), silicon (Si), tin (Sn), calcium (Ca), magnesium (Mg), aluminum (Al), niobium (Nb), zirconium (Zr), iron (Fe), tungsten (W), vanadium (V), manganese (Mn), cobalt (Co), nickel (Ni), zinc (Zn), and rare metal elements.

13. The method of claim 4, wherein the heat stabilizer (E) is one or a mixture of two or more selected from the group consisting of phenol-based, hydroquinone-based, benzyl alcohol-based, quinone-based, and amine-based compounds.

14. The method of claim 13, wherein the heat stabilizer is one or a mixture of two or more selected from the group consisting of phenothiazine, p-methoxyphenol, cresol, benzhydrol, 2-methoxy-p-hydroquinone, 2,5-di-tert-butylquinone, and diisopropylamine.

* * * * *

UNITED STATES PATENT AND TRADEMARK OFFICE
CERTIFICATE OF CORRECTION

PATENT NO. : 9,315,665 B2
APPLICATION NO. : 13/728701
DATED : April 19, 2016
INVENTOR(S) : Young Hyo Park et al.

Page 1 of 1

It is certified that error appears in the above-identified patent and that said Letters Patent is hereby corrected as shown below:

In the claims,

Column 14, Line 54, Claim 1, delete "in step 1), step 2)" and insert -- in step 2) --

Signed and Sealed this
Second Day of August, 2016

Michelle K. Lee
*Director of the United States Patent and Trademark Office*